(12) United States Patent
Oya (10) Patent No.: US 7,433,588 B2
(45) Date of Patent: Oct. 7, 2008

(54) CAMERA CONTROL APPARATUS, CAMERA CONTROL METHOD, PROGRAM AND STORAGE MEDIUM

(75) Inventor: Takashi Oya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 373 days.

(21) Appl. No.: 11/280,146

(22) Filed: Nov. 15, 2005

(65) Prior Publication Data

US 2006/0104625 A1 May 18, 2006

(30) Foreign Application Priority Data

Nov. 16, 2004 (JP) ............................. 2004-332374

(51) Int. Cl.
*G03B 17/00* (2006.01)
(52) U.S. Cl. .................... 396/153; 348/143; 348/152; 348/154; 348/155; 348/159; 348/207.1; 348/207.11
(58) Field of Classification Search ................ 348/143, 348/152, 155, 153, 154, 159, 169, 207.1, 348/207.11, 220.1, 700, 705, 208.14; 396/153
See application file for complete search history.

(56) References Cited

U.S. PATENT DOCUMENTS 5,568,222 A * 10/1996 Aoyama ..................... 396/123
6,807,360 B1 * 10/2004 Imai et al. ..................... 386/46
7,336,297 B2 * 2/2008 Ishigami et al. ............. 348/143
2005/0258950 A1 * 11/2005 Sahashi et al. .............. 340/444

FOREIGN PATENT DOCUMENTS

JP          2000-333159      * 11/2000
JP          2003-255442      *  9/2003

OTHER PUBLICATIONS

Arita et al, "Optical data transmission system with variable priority of integrated information", Japan Nuclear Power Society Journal, May 1987.*

* cited by examiner

*Primary Examiner*—W B Perkey
*Assistant Examiner*—Michael A Strieb
(74) *Attorney, Agent, or Firm*—Morgan & Finnegan LLP (57) ABSTRACT

Traveling photographing of a camera is controlled in accordance with a plurality of photographing parameters and priority orders of the plurality of photographing parameters, respective stored in a storage unit, a motion of an object photographed with the camera is detected on the basics of the photographing parameters, and the priority order corresponding to the photographing parameters used when the motion is detected is changed.

27 Claims, 10 Drawing Sheets

| PRESET NO. | PAN | TILT | ZOOM |
|---|---|---|---|
| 1 | −85.3 | 10.2 | 1.0 |
| 2 | −5.1 | −2.9 | 2.6 |
| 3 | 17.3 | 16.2 | 1.3 |
| 4 | 79.1 | 8.4 | 1.8 |

FIG. 3B

| TRAVELING NO. | PRESET NO. | PRIORITY |
|---|---|---|
| 1 | 2 | 3 |
| 2 | 4 | 1 |
| 3 | 1 | 3 |
| 4 | 3 | 5 |

| TRAVELING NO. | PRESET NO. | PRIORITY |
|---|---|---|
| 1 | 2 | 30.0 |
| 2 | 4 | 3.6 |
| 3 | 1 | 5.5 |
| 4 | 3 | 42.8 |

FIG. 8

| TRAVELING NO. | PRESET NO. | PRIORITY |
|---|---|---|
| 1 | 2 | 30.0 |
| 2 | 4 | 0.0 |
| 3 | 1 | 0.0 |
| 4 | 3 | 42.8 |

CAMERA CONTROL APPARATUS, CAMERA CONTROL METHOD, PROGRAM AND STORAGE MEDIUM

This application claims priority from Japanese Patent Application No. 2004-332374 filed Nov. 16, 2004, which is hereby incorporated by reference herein.

BACKGROUND OF THE INVENTION

1. Field of the Invention

The present invention relates to techniques for controlling traveling photographing of a camera in accordance with a plurality of photographing parameters.

2. Related Background Art

Cameras capable of being controlled by a computer are commercially available nowadays, and a combination of camera parameters such as posture and zoom is registered as a preset in a camera of this type. A monitor system using such a camera is provided with a function of controlling the camera by sequentially using a plurality of presets. This function is called preset traveling. There is a system which executes an image motion detection process in each preset of preset traveling (e.g., refer to Japanese Patent No. 2548814). This system prevents erroneous detection by inhibiting the motion detection process during controlling a camera.

Various methods have been proposed for techniques of tracking a moving object. For example, tracking control is performed by paying attention to the color and histogram of a moving object (e.g., refer to Japanese Patent Laid-open Publication No. H11-150676). It is also known that tracking is performed by storing a portion of a moving object as a template, and that tracking is performed by paying attention to a motion vector. An approach has also been proposed in which an image motion is detected in each preset during preset traveling, and if there is a motion, the moving object continues to be tracked (e.g., refer to Japanese Patent application Laid-open No. 2003-255442). This approach provides two camera control modes, a traveling mode and a tracking mode, and traveling control is stopped during tracking.

According to the above-described conventional methods, photographing and motion detection are conducted for all presets. Namely, traveling is performed equally for each preset. Because of this, an efficiency of abnormality detection based on motion detection in a monitor system is low.

SUMMARY OF THE INVENTION

The present invention solves the above-described problem and aims to provide a camera control apparatus capable of performing efficient traveling photographing in accordance with a motion at each set of photographing parameters, a camera control method, a program and a storage medium.

As one means for achieving this object, the present invention provides a camera control apparatus which comprises:

a storage unit for storing a plurality of photographing parameters and priority orders of the plurality of photographing parameters;

a control unit for controlling traveling photographing of a camera in accordance with the plurality of photographing parameters and priority orders stored in the storage unit;

a motion detection unit for detecting motion of an object photographed with the camera in accordance with the photographing parameters; and an update unit for updating the priority order corresponding to the photographing parameters to be used when the motion detection unit detects the motion.

Another object of the present invention is to provide a camera control apparatus capable of performing efficient traveling photographing in accordance with settings at each set of photographing parameters, a camera control method, a program and a storage medium.

As one means for achieving this object, the present invention provides a camera control apparatus which comprises:

a setting unit for setting a plurality of photographing parameters and priority orders of the plurality of photographing parameters; and a control unit for controlling traveling photographing of a camera in accordance with the plurality of photographing parameters set by the setting unit, and controls whether photographing is performed or skipped at each photographing parameter in accordance with the priority order.

BRIEF DESCRIPTION OF THE DRAWINGS

The above-described objects of the present invention will become apparent from the following drawings and the detailed description when read in conjunction with the drawings.

DESCRIPTION OF THE PREFERRED EMBODIMENTS

Embodiments of the present invention will be described with reference to the accompanying drawings.

First Embodiment

Figure 1:
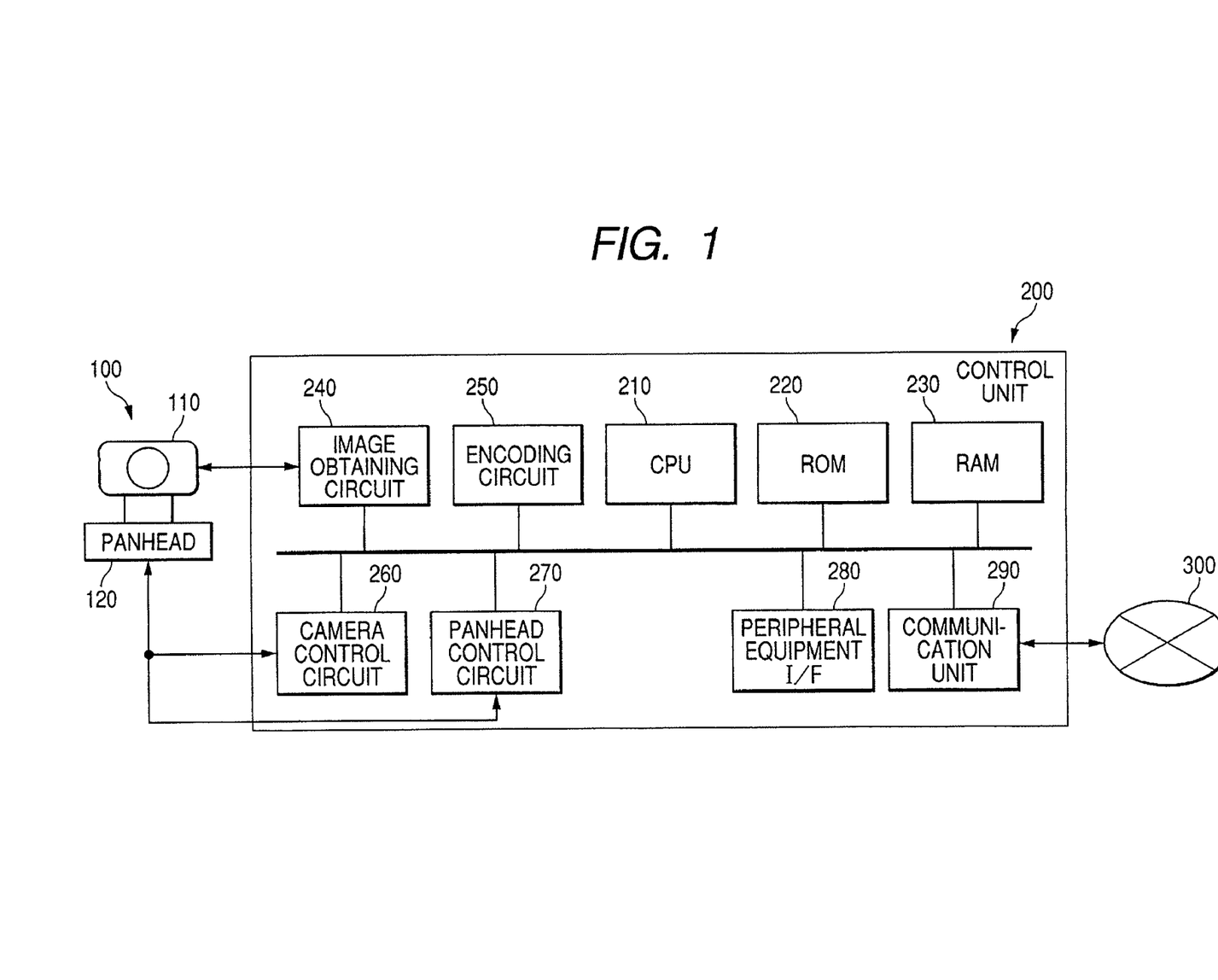
FIG. 1 is a block diagram showing the internal structure of an automatic tracking apparatus according to a first embodiment of the present invention.

FIG. 1 is a diagram showing the internal structure of an automatic tracking apparatus according to the first embodiment of the present invention. In the first embodiment, the automatic tracking apparatus will be described in which a priority order is allocated to each of a plurality of presets, the number of times of traveling is increased for a preset having a higher priority order, and when a motion is detected at each preset, tracking a moving object is automatically performed.

As shown in FIG. 1, the automatic tracking apparatus has a camera unit 100 and a control unit 200. The camera unit 100 has an optical system 110 and a panhead 120 which are connected to the control unit 200 via signal lines. The camera unit 100 has a control circuit (not shown) which controls a focus, an exposure, a shutter speed and the like of the optical system 110 and controls a posture of the panhead 120, in accordance with control signals from the control unit 200. The camera unit 100 may be constituted of a commercially available camera capable of being controlled by a computer.

The control unit 200 has a CPU 210, a ROM 220, a RAM 230, an image obtaining circuit 240, an encoding circuit 250, a camera control circuit 260, a panhead control circuit 270 and a peripheral equipment interface (I/F) 280 which are interconnected by an internal bus. The control unit 200 has a function of transmitting an image and an apparatus state to a network 300 via a communication unit 290, and receiving control signals. The encoding circuit 250 encodes an image signal. An image encoding method includes JPEG, MPEG1/2/4, H.264 and the like. The embodiment is not dependent upon the encoding method. The control unit 200 may be constituted of, for example, a personal computer or the like.

In this embodiment, although the camera unit 100 and control unit 200 have a separated structure, they may be integrated viewed as one outer appearance. A structure that a camera is connected to a general personal computer may be adopted, and in this case, an external display is connected to a video circuit (not shown) of the personal computer, and a mouse and a keyboard are connected to the peripheral I/F 280.

Figure 2:
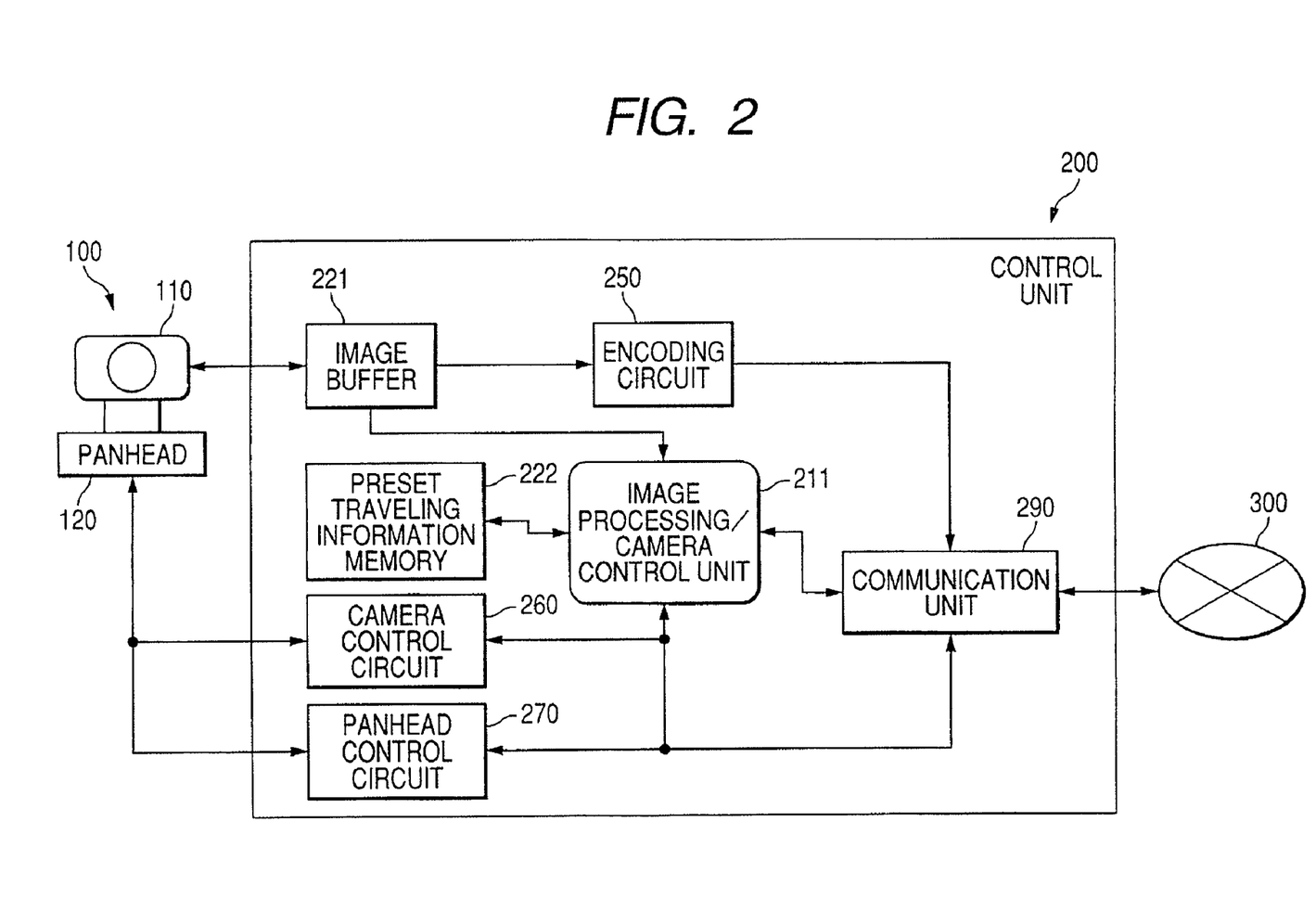
FIG. 2 is a block diagram showing the structure of the automatic tracking apparatus shown in FIG. 1 as viewed from the standpoint of camera control processing and image processing.

Next, description will be made on the automatic tracking apparatus of this embodiment as viewed from the standpoint of camera control processing and image processing. FIG. 2 is a block diagram showing the structure of the automatic tracking apparatus shown in FIG. 1 as viewed from the standpoint of camera control processing and image processing. In other words, FIG. 2 illustrates a flow of an image signal and control signals in the structure shown in FIG. 1, and functional blocks having the same function as that shown in FIG. 1 are represented by identical reference numerals. Description of part of the block having the identical reference numeral is omitted.

As shown in FIG. 2, the control unit 200 is constituted of an image processing/camera control unit 211, an image buffer 221, a preset traveling information memory 222, the encoding circuit 250, camera control circuit 260, panhead control circuit 270 and communication unit 290. The image buffer 211 and preset traveling information memory 222 are constituted of RAM 230 shown in FIG. 1, and the image processing/camera control unit 211 is constituted of CPU 210 shown in FIG. 1.

A flow of a camera control signal is different between preset traveling and automatic tracking. During preset traveling, first the image processing/camera control unit 211 reads out preset traveling information stored in the preset traveling information memory 222, and requests the camera control circuit 260 and panhead control circuit 270 to control the camera unit 100 in accordance with a control quantity written in the preset traveling information. Upon reception of this request, the panhead control circuit 270 drives the panhead 120 to make the optical system 110 take a corresponding posture, whereas the camera control circuit 260 controls the optical system 110 to photograph an image under corresponding photographing conditions.

During the automatic tracking, the image processing/camera control unit 211 performs image processing of an image photographed by the optical system 110, and determines the position of a tracking object on the screen in accordance with the image processing results. The image processing/camera control unit 211 generates a control signal for moving the tracking object to the determined position on the screen, and sends the control signal to the camera control circuit 260 and panhead control circuit 270. The camera control circuit 260 and panhead control circuit 270 drive and control the camera unit 100 in accordance with the control signal, similar to preset traveling.

In the case of an image signal, an image is obtained by the optical system 110, and the obtained image is stored in the image buffer 221. The image stored in the image buffer 221 is encoded by the encoding circuit 250 and thereafter transmitted to the network 300 via the communication unit 290. The image stored in the image buffer 221 is also input to the image processing/camera control unit 221 whereat an image motion detection process is executed in accordance with the input image. If a motion of the image is detected, the image processing/camera control unit generates a control signal for directing the camera unit 100 (optical system 110 and panhead unit 120) toward the image motion direction, and transmits the control signal to the camera control circuit 260 and panhead control circuit 270. In this manner, the camera unit 100 is controlled.

Information in the preset traveling information memory 222 is updated. An updating method of information in the preset traveling information memory 222 will be later detailed.

The image motion detection process is executed by using a difference between images. A difference between adjacent frames and a difference between backgrounds are known as a difference. A difference calculation method of a difference between adjacent frames uses an absolute value of a brightness difference of pixels having the same coordinate values, an absolute sum of differences between DCT coefficients in a JPEG encoding block unit, and the like. If a cumulated value of differences in a target area exceeds a preset threshold value, it is judged that there is a motion. This embodiment is not limited thereto, but an arbitrary type of motion detection process may be used.

Figure 3A:
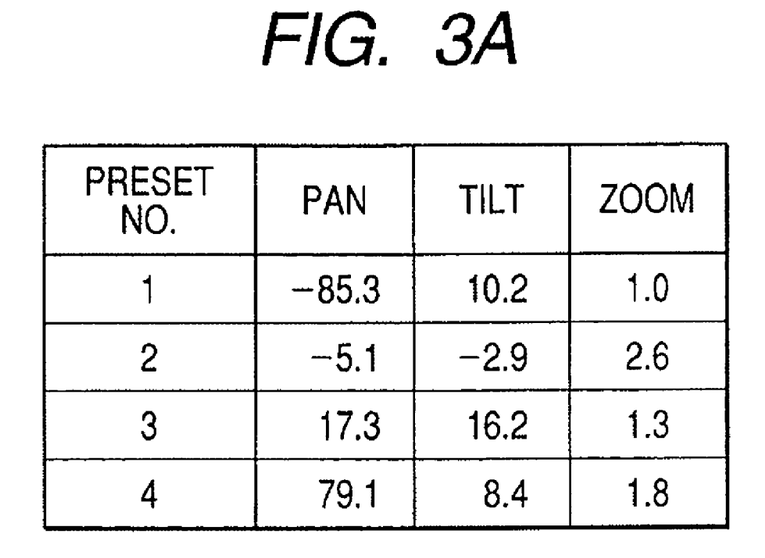
FIG. 3A is a diagram showing an example of preset information stored in a preset traveling information memory 222.

Next, with reference to FIGS. 3A and 3B, description will be made on information stored in the preset traveling information memory 222 (RAM 220). FIG. 3A is a diagram showing an example of preset information stored in the preset traveling information memory 222, and FIG. 3B is a diagram showing an example of traveling information stored in the preset traveling information memory 222.

Preset traveling information is stored in the preset traveling information memory 222 and classified into the preset information and traveling information. As shown in FIG. 3A, the preset information is constituted of information on a preset number, a pan value, a tilt value and a zoom value. In addition to this information, the preset information may include focus information and exposure information. However, for the convenience of description, in this embodiment, the preset information is intended to mean information containing only parameters necessary for automatic tracking, i.e., information containing only the preset number, pan, tilt and zoom values.

Figure 3B:
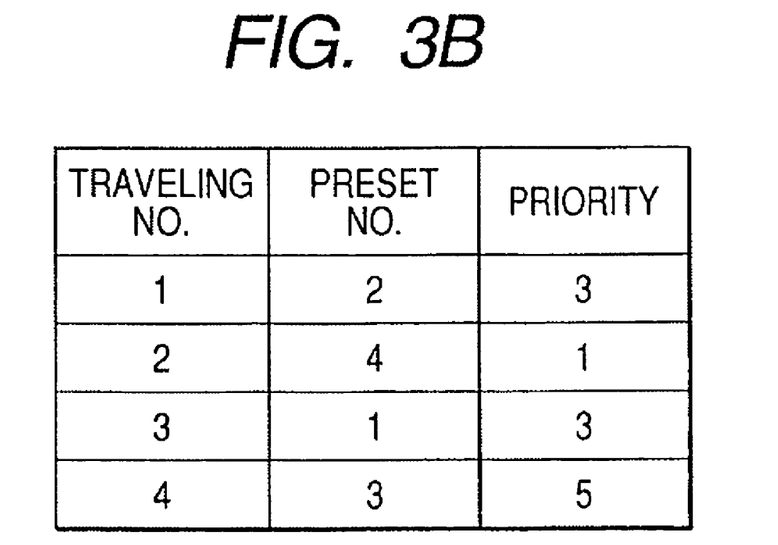
FIG. 3B is a diagram showing an example of traveling information stored in the preset traveling information memory 222.

As shown in FIG. 3B, the traveling information is constituted of information on a traveling number, a preset number and a priority order. In preset traveling, the camera unit 100 is controlled in the order of the traveling number to make the camera unit have pan, tilt and zoom values corresponding to the preset number. The priority order represents an occurrence frequency of motions in the preset. The higher the occurrence frequency of motions, the number of times of camera control in the preset traveling is increased more. For example, for the preset having a priority order of "5", camera control is performed always for each traveling cycle, whereas for the preset having a priority order of "1", camera control is performed once per five traveling cycles.

Figure 4:
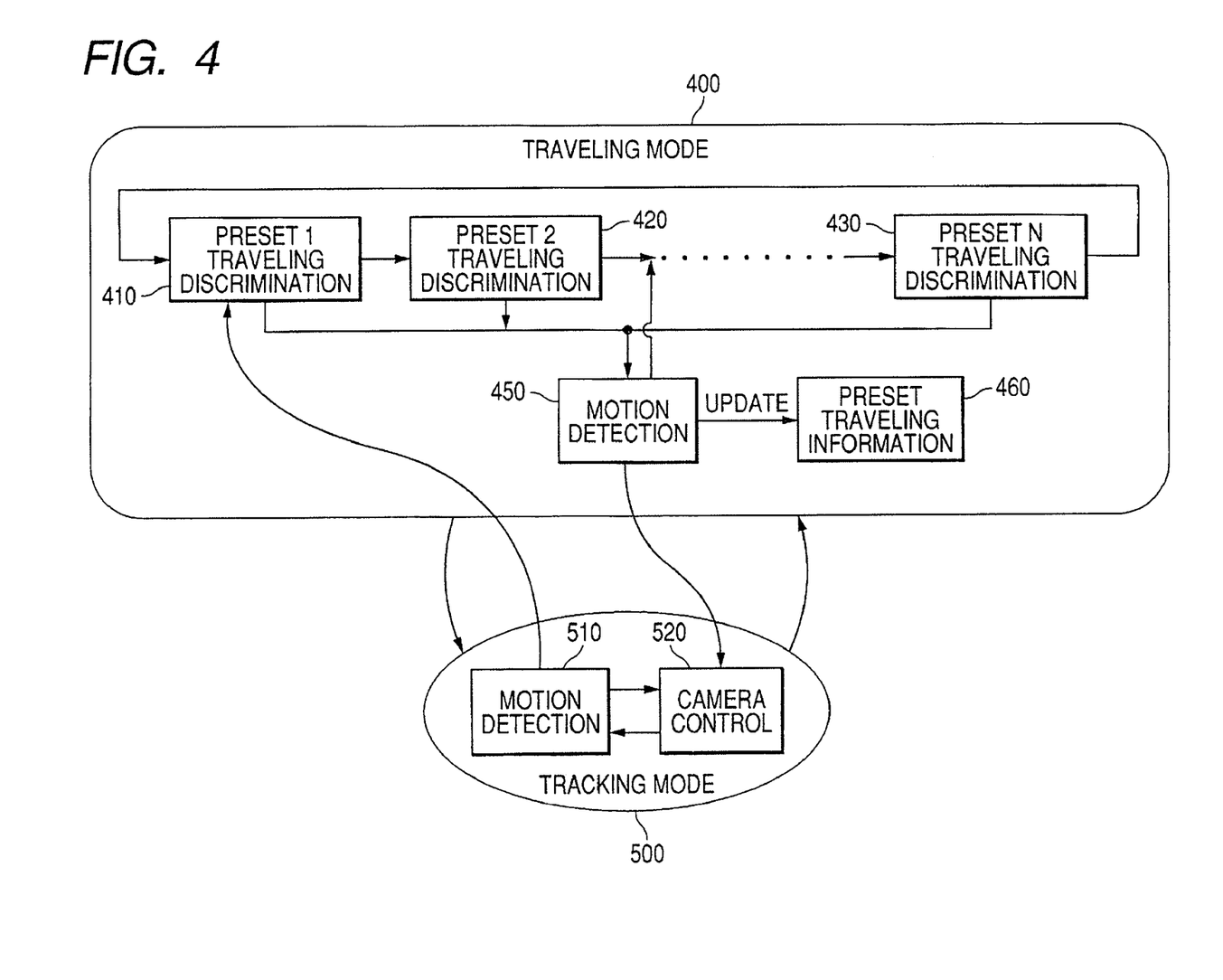
FIG. 4 is a schematic diagram showing state transition between a traveling mode and a tracking mode to be executed by the automatic tracking apparatus shown in FIG. 1.

Next, with reference to FIG. 4, description will be made on the outline of a software process sequence of this embodiment. FIG. 4 is a schematic diagram showing state transition between a traveling mode and a tracking mode to be executed by the automatic tracking apparatus shown in FIG. 1.

As shown in FIG. 4, the automatic tracking apparatus of the embodiment has a traveling mode 400 and a tracking mode 500.

The traveling mode 400 is a mode of performing preset traveling which controls the camera unit 100 in the order of the traveling number to make the camera unit have the pan, tilt and zoom values corresponding to the preset number. In this mode, traveling discrimination processes 410, 420, . . . , 430 for each preset are executed. In the traveling discrimination process, first, preset traveling information of a corresponding preset is referred to. In accordance with the priority order (shown in FIG. 3B) of the traveling information, it is judged whether camera control (zoom drive, posture control and the like of the camera unit 100 based upon the preset information shown in FIG. 3A) is performed or not. Each preset is provided with a traveling point. The traveling point is incremented by an amount corresponding to the priority order each time the traveling discrimination process is executed. When the traveling point reaches a traveling permission point, the camera control is performed. Once the camera control is performed, the traveling point is decremented by an amount corresponding to the traveling permission point. For example, if the priority order is "5" and the traveling permission point is "10", then the camera control is performed once per two traveling cycles. If the priority order is "3" and the traveling permission point is "10", the camera control is performed once per four traveling cycles, because the traveling point becomes "12" when the fourth traveling cycle is performed. In this case, the traveling point is decremented by the traveling permission point and takes a value of 2 (=12−10).

First, the traveling discrimination process 410 is performed for the preset #1. If this process judges that the camera control is not performed, the traveling discrimination process 420 is executed for the next preset #2. If the traveling discrimination process 410 judges that the camera control is performed, a motion detection process 450 starts after completion of the operation of the camera unit 100 (zoom drive, posture position decision and the like). If a motion of the moving object, i.e., image, is not detected even after a lapse of a predetermined time after the start of the motion detection process 450, the traveling discrimination process 420 of the preset #2 starts. In this manner, the traveling discrimination process of each preset is sequentially executed, and in accordance with the result of the traveling discrimination process, the camera control and motion detection process 450 are executed. As the traveling discrimination process of the last preset N is completed, one traveling cycle is completed. In order to start the next traveling cycle, the traveling discrimination process is repeated again from the preset #1.

It is assumed as shown in FIG. 4 that a motion (moving object) is detected by the motion detection process 450 after the camera control caused by the traveling discrimination process 420 of the preset #2. In this case, after an update process 460 of the preset traveling information, transition is conducted from the traveling mode 400 to the tracking mode 500. The update process 460 of the preset traveling information is a process of changing the priority order of the traveling information in accordance with the motion detection result. If a motion is detected by the motion detection process 450 after the camera control caused by the traveling discrimination process 420 of the preset #2, the priority order of "3" of the preset number #2 shown in FIG. 3B is raised to "4". On the other hand, if a motion is not detected even if the motion detection process 450 is executed plural times, the priority order of "3" is lowered to "2". Since a motion is not detected usually in many cases, the priority order may be lowered if a motion is not detected, for example, during one day. The priority order can be considered representing a motion occurrence frequency. By updating the value of the priority order, it is possible to deal with a dynamic change corresponding to the motion occurrence frequency.

In the tracking mode 500 transitioned in response to motion detection by the motion detection process 450, for example, an area of an image where a motion was detected is obtained in accordance with the motion information obtained by the motion detection process 450. A camera control process 520 is executed so as to move the gravity center of the area to the image center. After the camera control process 520 and after the operation (such as posture) of the camera unit 100 is stabilized, a motion detection process 510 is executed. If a motion is detected, the camera control process 520 is executed again. As described above, in the tracking mode 500, the motion detection process 510 and camera control process 520 are alternately executed. This is because an erroneous detection is made due to a motion of the camera 110 if the inter-frame difference process is executed while the camera 100 is moved. A tracking method is not limited to that described above. For example, tracking may be performed continuously by storing feature amounts such as color, design and edge of a moving object.

As a motion detection by the motion detection process 510 fails, the tracking mode 500 is transitioned to the traveling mode 400 to start again the preset traveling. A motion detection failure by the motion detection process 510 is decided if the motion detection is failed at least consecutive times. When the tracking mode 500 is transitioned to the traveling mode 400, as shown in FIG. 4, the traveling mode starts from the traveling discrimination process 410 of the first preset #1. The process may return to the traveling discrimination process of the preset from which the mode was transitioned to the tracking mode 500, the traveling discrimination process of the preset having the highest priority order, or other traveling discrimination processes.

Figure 5:
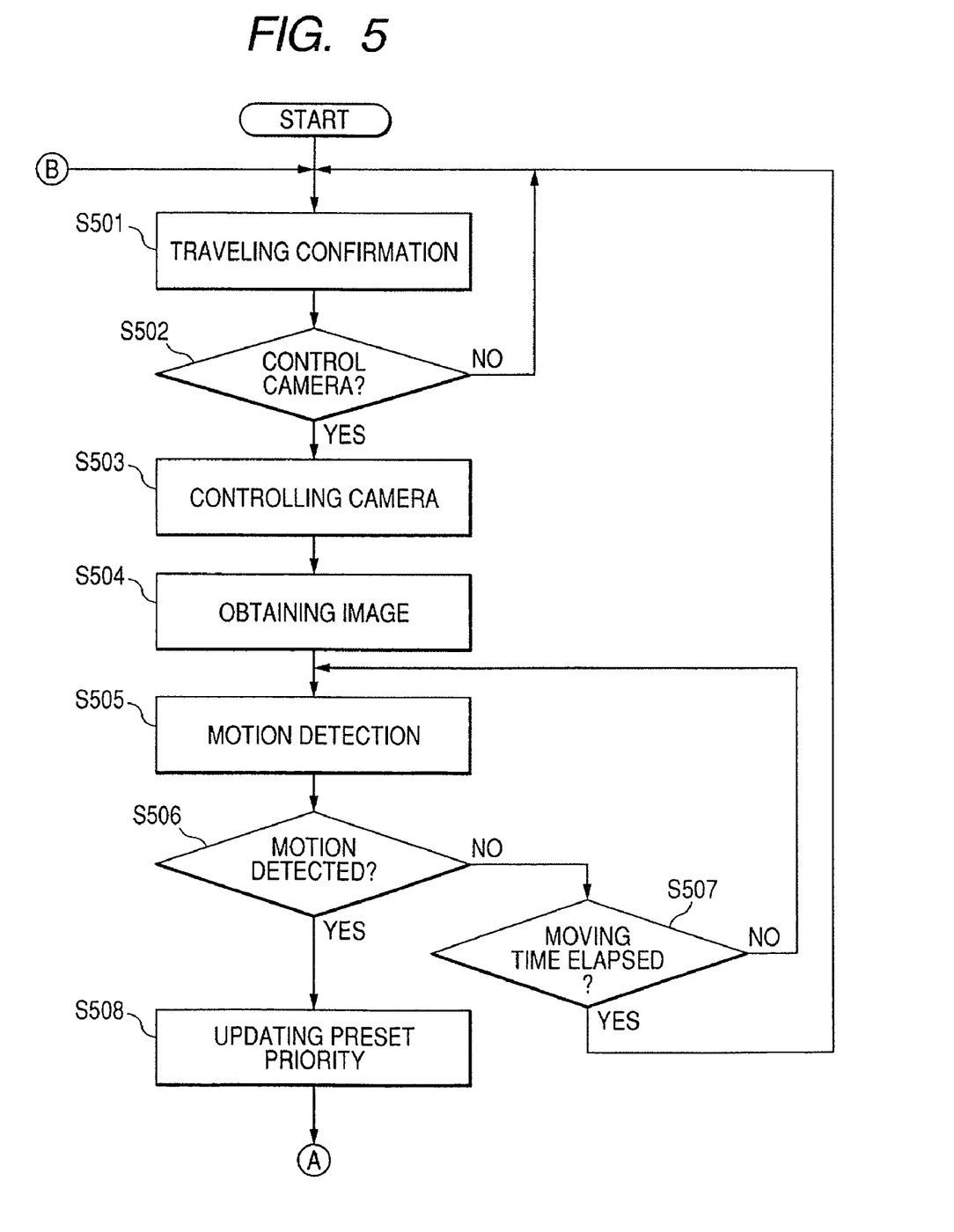
FIG. 5 is a flow chart illustrating a process sequence of a traveling mode 400 and a tracking mode 500 of the moving object tracking apparatus shown in FIG. 1.
Figure 6:
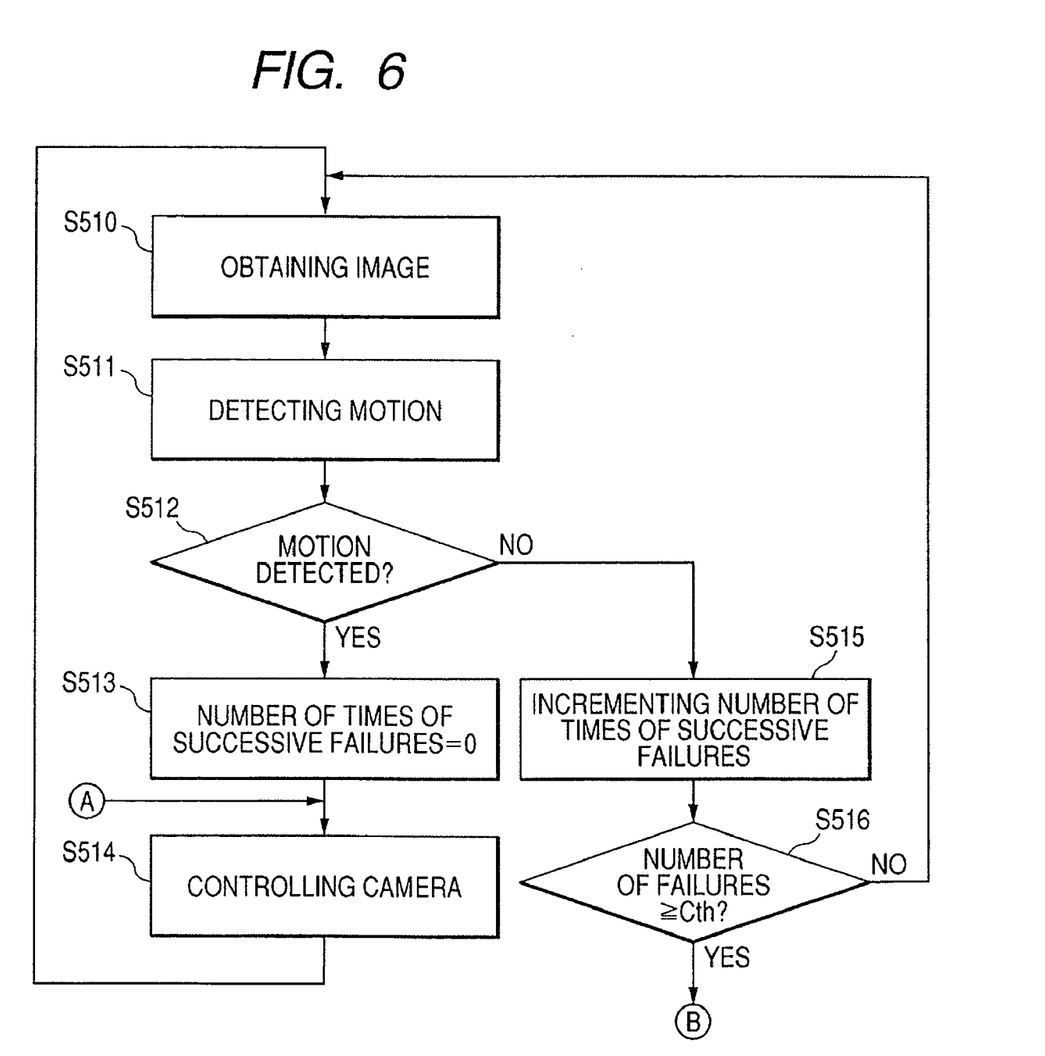
FIG. 6 is a flow chart illustrating a process sequence of the traveling mode 400 and tracking mode 500 of the moving object tracking apparatus shown in FIG. 1.

Next, with reference to FIGS. 5 and 6, description will be made on the processes to be executed in the traveling mode 400 and tracking mode 500 according to the embodiment. FIGS. 5 and 6 are flow charts illustrating the process sequence of the traveling mode 400 and tracking mode 500 of the moving object tracking apparatus shown in FIG. 1. The process sequence from Step S501 to Step S508 shown in FIG. 5 corresponds to that of the traveling mode 400, and the process sequence from Step S510 to Step S516 shown in FIG. 6 corresponds to that of the tracking mode 500. The process sequence shown in the flow charts of FIGS. 5 and 6 is executed by the image processing/camera control unit 211 (CPU 210).

As shown in FIG. 5, first at Step S501 the image processing/camera control unit 211 executes the traveling discrimination process for the first preset by the method described above. At Step S502 the image processing/camera control unit 211 judges whether the camera control is performed, in accordance with the result of the traveling discrimination process. If it is judged that the camera control is not performed, the image processing/camera control unit 211 returns to Step S501 to execute the traveling discrimination process for the next preset.

If it is judged at Step S502 that the camera control is performed, at Step S503 the image processing/camera control unit 211 controls the camera 110 to move it to a preset position. At next Step S504 one image photographed with the camera 110 is stored in the image buffer 221.

Next, at Step S505 the image processing/camera control unit 211 executes the motion detection process, and at next Step S506 it is judged whether the motion detection process detects a motion. If a motion is not detected, at Step S507 the image processing/camera control unit 211 judges whether the time for traveling transition to the next preset position has elapsed. If the time is not elapsed, the image processing/camera control unit 211 returns to Step S505 to continue the motion detection process. If the time has elapsed, the image processing/camera control unit 211 returns to Step S501 to start the process of judging whether traveling transition to the next preset position is performed.

If a motion is detected at Step S506, at Step S508 the image processing/camera control unit 211 updates the current priority order by the method described earlier, and advances to Step S514 shown in FIG. 6 in order to transition to the tracking mode.

At Step S514 the image processing/camera control unit 211 obtains a camera control quantity through image processing. In this case, as described earlier, the camera control quantity is obtained so that the gravity center of a motion area in the image moves to the image center, and the camera control is performed by using the obtained camera control quantity. The image processing/camera control unit 211 starts the next motion detection process, obtains the image at Step S510, and executes the motion detection process at next Step S511. This motion detection process is the same as that at Step S504.

Next, at Step S512 the image processing/camera control unit 211 judges whether the motion detection process detects a motion. If a motion is detected, at Step S513 the image processing/camera control unit 211 initializes the number of consecutive failures of the tracking process to "0", and performs the above-described camera control at next Step S514.

If a motion is not detected at Step S512, at Step S515 the image processing/camera control unit 211 increments the number of consecutive failures of the tracking process by "1". The image processing/camera control unit 211 judges whether the number of consecutive failures is a threshold value Cth or larger. If the number of consecutive failures is Cth or larger, the image processing/camera control unit 211 advances to Step S501 to transition to the traveling mode. If the number of consecutive failures is smaller than Cth, the image processing/camera control unit 211 returns to Step S510 to continue the tracking mode.

As described above, according to the embodiment, during preset traveling, it is judged whether the camera control is performed in accordance with the priority order corresponding to each preset. Therefore, each preset can be discriminated from the viewpoint of motion detection, an abnormality detection by detecting a motion can be performed efficiently, and an unnecessary load (a load of the process of detecting a motion) on the apparatus can be avoided in advance. Further, as a motion is detected in the preset for which the camera control was performed, the moving object is tracked. Therefore, it is possible to detect and track a moving object at each preset with high precision.

Second Embodiment

Figure 7:
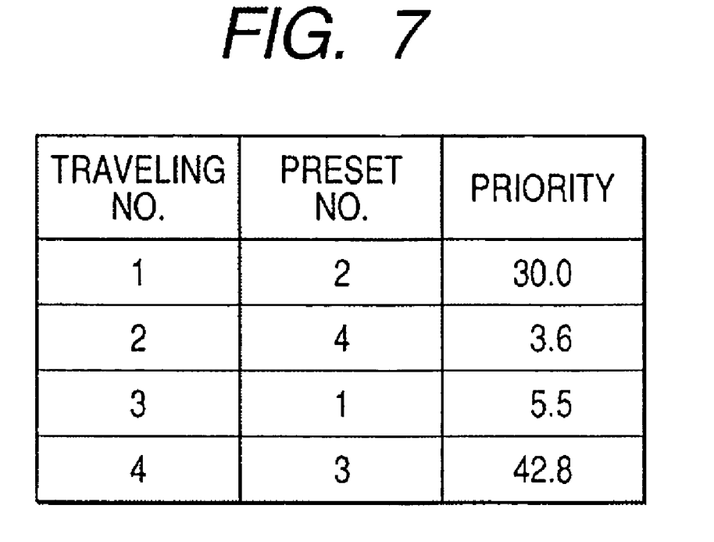
FIG. 7 is a diagram showing an example of preset traveling information when a motion detection occurrent probability is used as a priority order in an automatic tracking apparatus according to a second embodiment of the present invention.

Next, with reference to FIGS. 7 and 8, the second embodiment of the present invention will be described. FIG. 7 is a diagram showing an example of preset traveling information when a motion detection occurrence probability is used as a priority order in an automatic tracking apparatus according to the second embodiment of the present invention, and FIG. 8 is a diagram showing another example of preset traveling information different from the preset traveling information shown in FIG. 7.

In the second embodiment, instead of the motion detection occurrence frequency of the first embodiment, a motion detection occurrence probability is used as the priority order of preset travelling, in order to set a traveling pattern more trusty to actual motion occurrence phenomena.

Specifically, as shown in FIG. 7, a motion detection occurrence probability is used as the priority order of preset traveling. The priority order, i.e., a value of the motion detection occurrence probability, takes a value from 0% to 100%. Similar to the first embodiment, whether a motion detection is performed in preset traveling may determined in the following manner. Namely, the priority order is added at each traveling and when the value reaches 100%, traveling is performed at the preset position. Not "once per several times", but a motion detection occurrence rate stored as the priority order may be used directly as the travelling probability (probability of performing camera control at each preset). In this case, an instruction "travelling" is issued at a motion detection occurrence rate stored as the priority order, using a random number function in actual program implementation.

Figure 8:
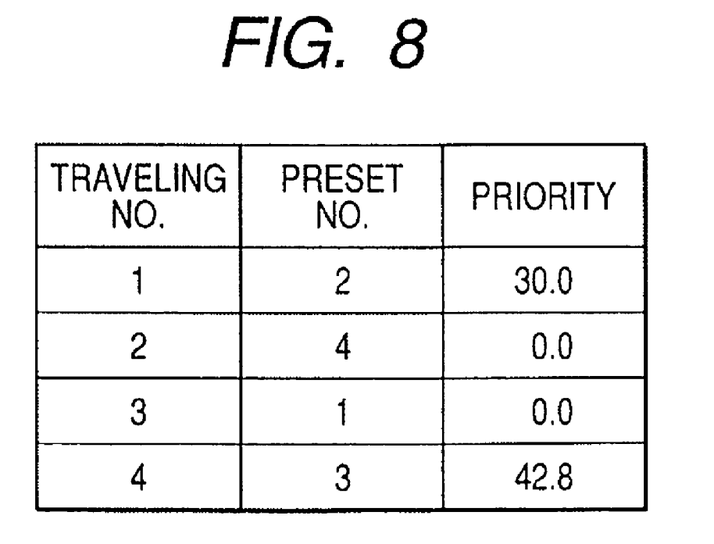
FIG. 8 is a diagram showing another example of preset traveling information different from the preset traveling information shown in FIG. 7.

In this embodiment, as shown in FIG. 8, the range of a value of the priority order can be broadened from 0% to 100%. The motion detection occurrence rate of 0% means a simple preset traveling operation that although the camera control at the preset is performed, the motion detection process is not performed and as the time elapses, the next preset is transitioned automatically.

Third Embodiment

Figure 9A:
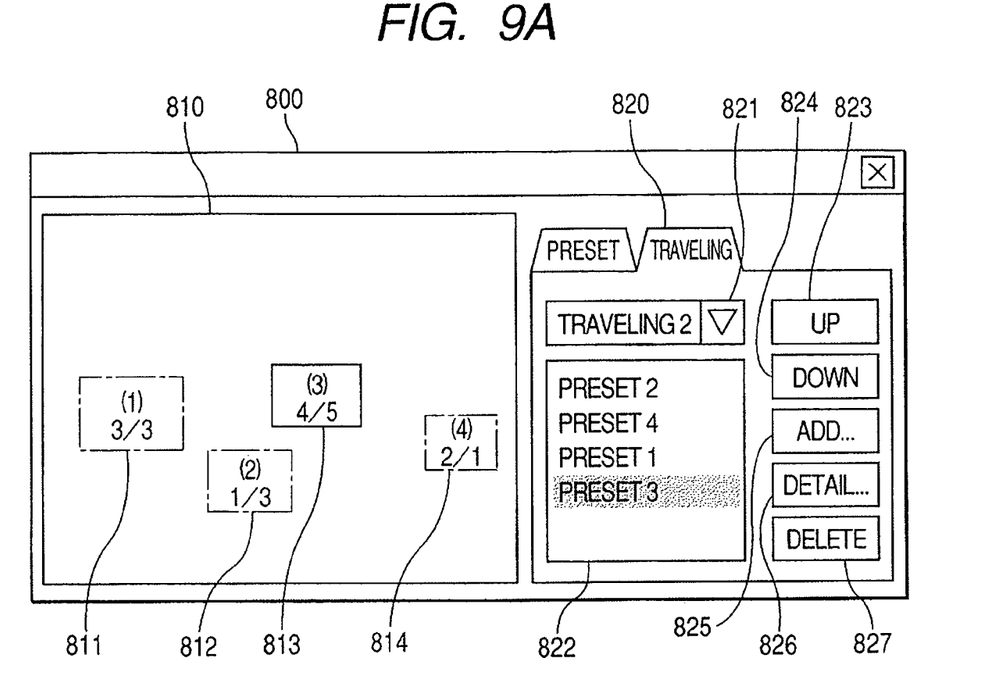
FIGS. 9A, 9B and 9C are diagrams showing an example of a user interface screen to be used for preset settings and traveling settings of an automatic tracking apparatus according to a third embodiment of the present invention.
Figure 9B:
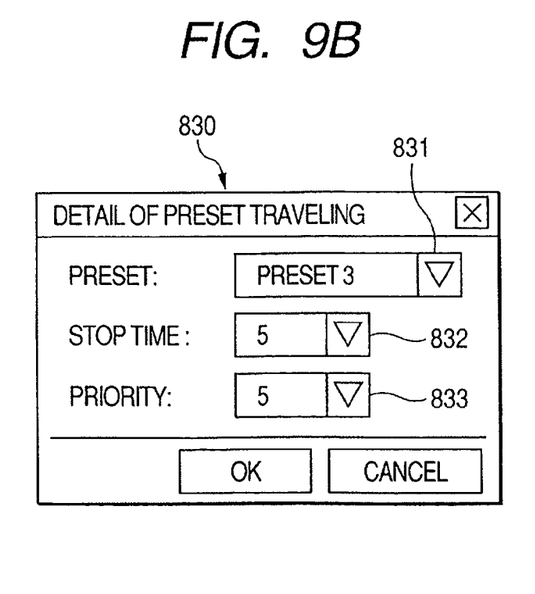
Figure 9C:
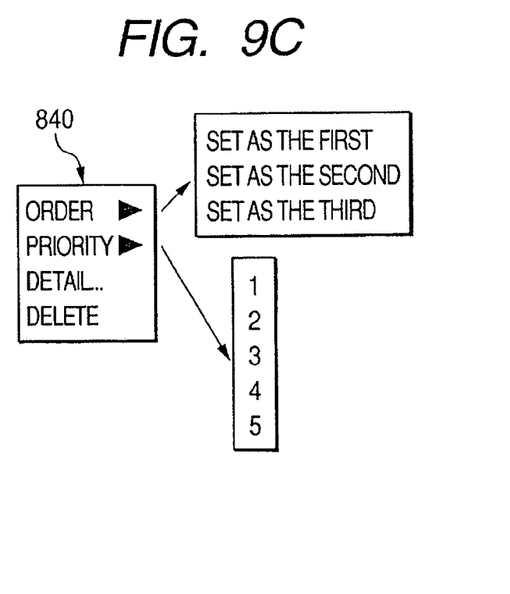
Figure 10:
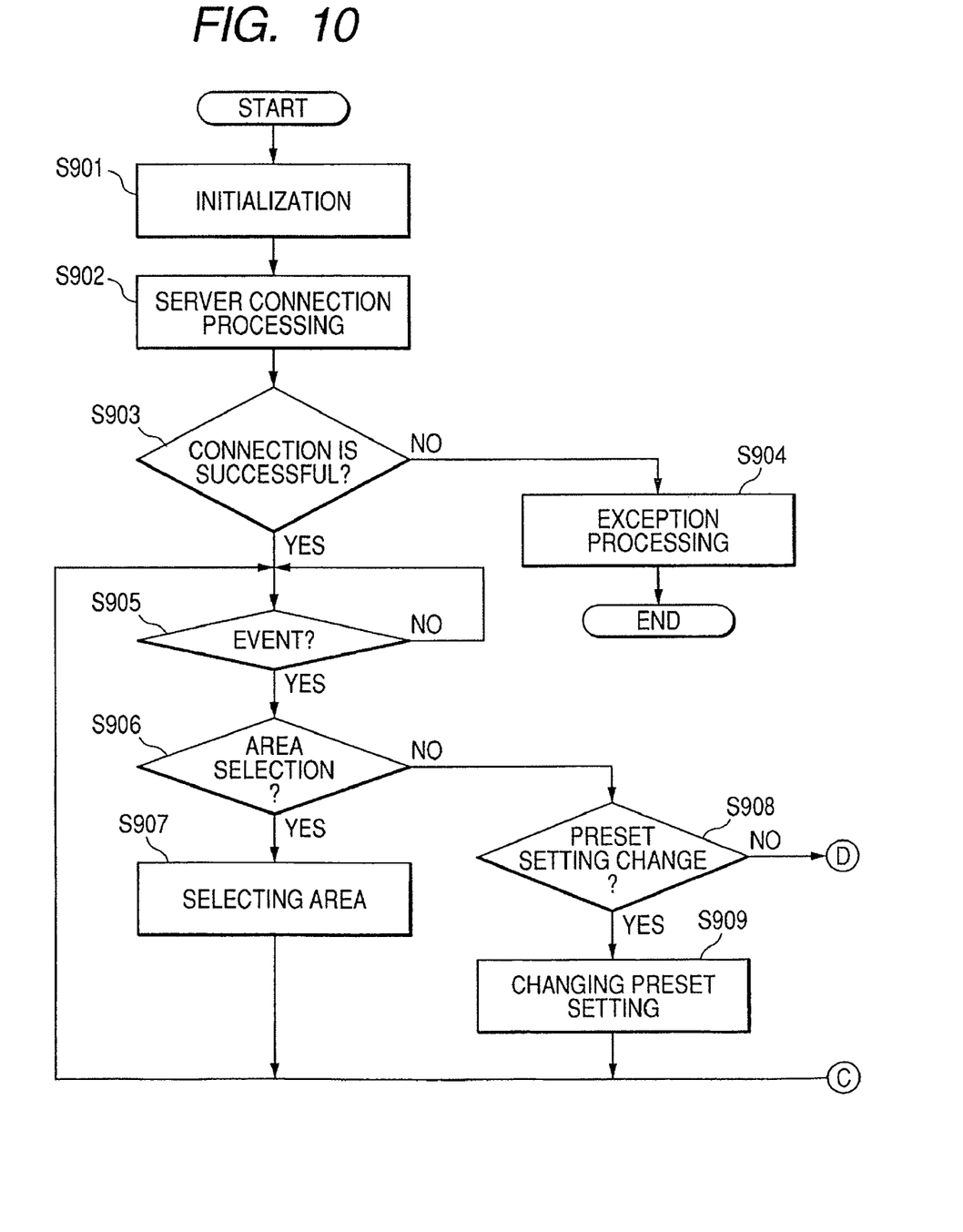
FIG. 10 is a flow chart illustrating a procedure of performing preset settings and traveling settings by using the user interface shown in FIGS. 9A, 9B and 9C.
Figure 11:
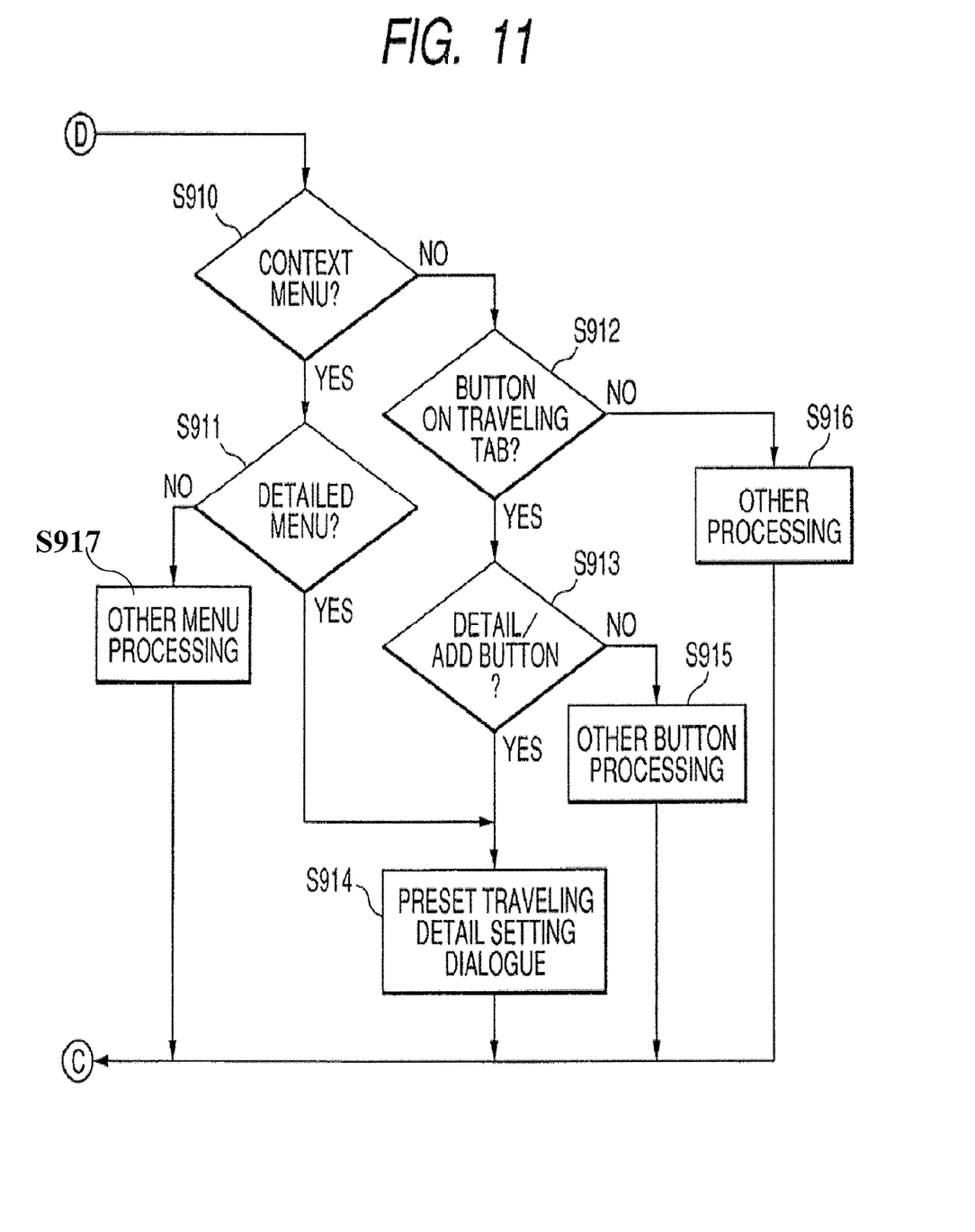
FIG. 11 is a flow chart illustrating a procedure of performing preset settings and traveling settings by using the user interface shown in FIGS. 9A, 9B and 9C.

With reference to FIGS. 9A, 9B, 9C, 10 and 11, the third embodiment of the present invention will be described. FIGS. 9A, 9B and 9C are diagrams showing an example of a user interface screen to be used for preset settings and traveling settings of an automatic tracking apparatus according to the third embodiment of the present invention. FIGS. 10 and 11 are flow charts illustrating a procedure of performing preset settings and traveling settings by using the user interface shown in FIGS. 9A, 9B and 9C.

The third embodiment has GUI (Graphical User Interface) to be used for preset settings and traveling settings. This GUI is realized by application software implemented in a predetermined OS (Operating System). This application software may be implemented in the automatic tracking apparatus or may be implemented in a client PC connected to the automatic tracking apparatus via the network 300. Preset settings and traveling settings can therefore be performed by using GUI on the automatic tracking apparatus or client PC.

In performing preset settings and traveling settings, GUI displays a dialog 800 such as shown in FIG. 9A. The dialog 800 includes a preset position display window 810 and preset/traveling setting tabs 820. The preset position display window 810 displays a view field range capable of being physically controlled by the camera unit 100, and pan, tilt and zoom values of each preset are indicated by a rectangular frame representative of the view field. The preset/traveling setting tabs 820 are used for selecting preset settings and traveling settings. The screen shown in FIG. 9A shows that the traveling settings are selected. The preset settings are used for setting pan, tilt and zoom values and the like of each preset. The traveling settings are used for registering and editing presets to be traveled.

Next, the detail of the traveling settings will be described. First, "traveling" is selected by the preset/traveling setting tabs 820. This tab includes traveling number selection 821, a preset traveling list 822, traveling order change buttons 823 and 824, a preset traveling addition button 825, a preset traveling detail button 826, a preset traveling delete button 827 and the like. A plurality of traveling can be set for preset traveling. Each time traveling is set, a traveling number to be set is selected by the traveling number selection 821. In this example, "traveling #2" is selected.

As the traveling number is selected, a list of registered presets is displayed in the preset traveling list window 822 in the order of traveling. A traveling order can be changed for each of the displayed presets. In this example, a preset whose order is to be changed is selected, and the order of the selected preset is changed to the upstream side or downstream side by using the traveling order change buttons 823 and 824. As the delete button 827 is depressed for the selected preset, the preset can be deleted from the list.

When the presets are to be edited, the detail button 826 is depressed. A preset traveling detail setting dialog 830 such as shown in FIG. 9B is therefore displayed. Similarly, when a preset is to be added, the addition button 825 is depressed so that a preset traveling addition dialog is displayed and addition becomes possible. The added preset is disposed at the last of the list in the preset traveling list display window 822. This addition dialog is different from the preset detail setting dialog only in the title, and has the same fundamental operation.

In the preset traveling detail dialog 830, it is possible to select and set a preset number 831, a stop time 832 and a traveling priority order 833. After these settings, as an "OK button" is depressed, the settings are established and information belonging to the corresponding preset in the preset traveling list displayed in the preset traveling list display window 822 is updated. When the preset traveling addition dialog is activated, a new preset can be registered by a similar procedure.

Next, description will be made on the preset position display window 810. In the preset position display window 810, pan, tilt and zoom values of each of the presets in a list displayed in the preset traveling list display window 822 are displayed as a rectangular frame representative of the view field range. In FIG. 9A, rectangular frames 811 to 814 corresponding to four presets, a preset #1 to a preset #4 are displayed. The rectangular frame 813 is displayed emphatically, corresponding to the presently selected preset #3 in the list displayed in the preset traveling list display window 822. The position and size of the rectangular frame representative of the preset can be changed by a drag operation or the like. In the rectangular frame corresponding to the preset, a preset number, a traveling number and a priority order are displayed by using numerical numbers. These information may be displayed always or may be displayed in a small window displayed when a mouse cursor is superposed upon the preset rectangular frame area. As the mouse is right-clicked on the rectangular frame area of the selected preset, a context menu such as shown in FIG. 9C is displayed. It is possible to change the traveling order, change and delete the priority order, and etc. in the context menu 840.

Next, with reference to FIGS. 10 and 11, description will be made on an operation of performing preset settings and traveling settings by using GUI according to the embodiment. In the following description, it is assumed that a client PC on the network 300 performs preset settings and traveling settings.

As shown in FIG. 10, first, at Step S901 the client PC executes initialization, and then at next Step S902, executes a connection process for the server, i.e., automatic tracking apparatus. At Step S903 the client PC judges whether a connection to the server succeeds or fails. If a connection to the server fails, at Step S904 the client PC executes an exception process such as displaying an error message to thereafter terminate the process.

If it is judged at Step S903 that a connection to the server succeeds, at Step S905 the client PC waits for an event. When an event is generated, at Step S906 the client PC judges whether the generated event is intended to select the preset rectangular frame area in the preset position display window 810. If the generated event selects the preset rectangular frame area, at Step S907 the client PC sets the selected rectangular frame area in a selected state, 10 and sets the corresponding preset in the list displayed in the traveling setting preset prevailing list display window 822 in a selected state. Then, the client PC returns to Step S905 to wait for the next event.

If it is judged at Step S906 that the generated event does not select a preset rectangular frame area in the preset position display window 810, the flow advances to Step S908. At Step S908 the client PC judges whether the generated event is a change request for the selected rectangular frame display (a drag operation performed for the selected rectangular frame). If the generated event is a change request for the display of the selected rectangular frame, at Step S909 the client PC changes the position and size of the selected rectangular frame in accordance with the drag operation. The client PC returns to Step S905 to wait for generation of the next event.

If it is judged at Step S908 that the generated event is not a change request for the selected rectangular frame display, the flow advances to Step S910 whereat the client PC judges whether the generated event is a display request (right click of the mouse in the state that the rectangular frame is selected) for the context menu of the selected rectangular frame. If the generated event is a display request for the context menu of the selected rectangular frame, the flow advances to Step S911 whereat the client PC judges whether the detailed menu is selected in the context menu (whether the detail button 826 is depressed).

If it is judged at Step S911 that the detail menu is not selected, at Step S917 the client PC executes other menu processing to thereafter return to Step S905. The other menu processing includes changing the traveling order and changing and deleting the priority order. For the former two operations, the values selected on the context menu are reflected upon internal data. For the last operation, i.e., deletion, the preset is deleted from the preset traveling list. In this case, the preset is deleted from the list in the preset traveling list display window 822 for the traveling tab.

If it is judged at Step S911 that the detail menu is selected, at Step S914 the client PC displays the preset traveling detail setting dialog 830. In accordance with the traveling information input to the preset traveling detail setting dialog 830, the client PC changes parameters and thereafter returns to Step S905 to wait for the next event.

If it is judged at Step S910 that the generated event is not a display request for the context menu, at Step S912 the client PC judges whether the generated event is an event of depressing various buttons on the traveling tab. If the generated event is an event of depressing various buttons on the traveling tab, at Step S913 the client PC judges whether the generated event is an event of depressing the detail button 826 or addition button 825.

If it is judged at Step S913 that the generated event is an event of depressing the detail button 826 or addition button 825, at Step S914 the client PC displays the preset traveling detail setting dialog 830. In case that the addition button 825 is depressed, the addition setting dialog is displayed. The process sequence for the addition setting dialog is essentially the same as that of the above-described detail settings.

If it is judged at Step S913 that the generated event is not an event of depressing the detail button 826 or addition button 825, at Step S915 the client PC performs other button processing to thereafter return to Step S905. The other button processing includes "up" of the list, "down" of the list, "delete" and the like. The "up" and "down" of the list are used for determining the order of traveling and changing the display position on the list. The "delete" is a process of deleting the preset from the traveling list. In this case, the corresponding preset display rectangular frame on the preset position display window 810 is also deleted.

If it is judged at Step S912 that the generated event is not an event of depressing various buttons on the traveling tab, at Step S916 the client PC performs other processing. The other processing includes processing for the traveling number selection 821, preset traveling list 822 and the like. As the traveling number selection 821 is operated, the traveling number to be set is changed. As a preset is designated in the preset traveling list 822, the designated preset enters a selected state, and the rectangular frame of the preset in the preset position display window 810 also enters a selected state. The client PC returns thereafter to Step S905.

As described above, according to this embodiment, it is possible to easily set a list of presets, an order of traveling, a fine correction of a preset position, and a priority, respectively necessary for preset traveling.

In each of the above embodiments, although the automatic tracking apparatus has been described, the invention is not limited thereto. For example, the traveling mode 400 may be provided in a monitor apparatus having only the traveling mode but omitting the tracking mode therefrom. In this case, a monitor apparatus can be provided which can attain the effects that each preset can be discriminated from the viewpoint of motion detection, and an unnecessary load (a load of the process of detecting a motion) on the apparatus can be avoided in advance.

It is obvious that the objects of the present invention can be achieved by supplying a system or an apparatus with a storage medium (or recording medium) recording software program codes realizing the function of each embodiment described above and making a computer (or CPU or MPU) of the apparatus or system read and execute the program codes stored in the recording medium. In this case, the software program codes themselves read from the storage medium realize the embodiment function. Therefore, the storage medium storing the program codes constitutes the present invention.

The storage medium for supplying such program codes may be a floppy disk, a hard disk, a magneto optical disk, a CD-ROM, a CD-R, a CDRW, a DVD-ROM, a DVD-RAM, a DVD-RW, a DVD+RW, a magnetic tape, a nonvolatile memory card, a ROM or the like. The program codes may be downloaded via a network.

The present invention covers also the case in which not only the embodiment function is realized by executing the computer read program codes but also the embodiment function is realized by making an OS (operating system) running on the computer execute a portion or the whole of actual processes in accordance with instructions from the program codes.

The present invention also includes the case wherein the functions of each embodiment can be realized by writing the program codes read from the storage medium into a memory of a function expansion board inserted into a computer or of a function expansion unit connected to the computer, and thereafter making a CPU or the like of the function expansion board or function expansion unit execute a portion or the whole of actual processes in accordance with instructions from the program codes.

The present invention has been described in connection with the preferred embodiments. The present invention is not limited to the above-described embodiments, but various modifications are possible without departing from the scope of claims.

What is claimed is:

1. A camera control apparatus comprising:
a storage unit for storing a plurality of presets each having a plurality of photographing parameters of a camera and priority orders of each of said plurality of presets;
a control unit for controlling traveling photographing of the camera in accordance with said plurality of presets and priority orders stored in said storage unit;
a motion detection unit for detecting motion of an object photographed with the camera; and
an update unit for raising the priority order corresponding to one of said plurality of presets which is used when said motion detection unit detects the motion.

2. The camera control apparatus according to claim 1, wherein said control unit controls the camera to perform photographing by the presets if the priority order of the presets is set to a threshold value or higher, and to transition to next preset without performing photographing by the preset, if the priority order of the preset is set lower than said threshold value.

3. The camera control apparatus according to claim 1, wherein each time the preset of said camera transitions to next preset, said update unit lowers the priority order by a threshold value if the priority order of the preset is set to said threshold value or larger, and raises the priority order by a predetermined number if the priority order of the preset is set lower than said threshold value.

4. The camera control apparatus according to claim 1, wherein if said motion detection unit does not detect a motion of the photographed object, said update unit lowers the priority order of the preset with which said image is photographed.

5. The camera control apparatus according to claim 1, wherein if said motion detection unit detects a motion of said photographed object, said control unit stops control of the traveling photographing and starts tracking control for an object corresponding to said motion detected image.

6. The camera control apparatus according to claim 5, wherein said control unit performs zoom control together with said tracking control, said zoom control enlarging an area where the motion of said photographed object is detected.

7. The camera control apparatus according to claim 5, wherein said control unit controls to alternately and repetitively perform said tracking control and motion detection, by said motion detection unit, of the object photographed with said camera, and if the number of times when said motion detection unit does not detect the motion of the image in succession during said repetitive control, reaches a predetermined number, said control unit stops said tracking control and resumes the control of the traveling photographing.

8. The camera control apparatus according to claim 7, wherein when the control resumes, said control unit uses the preset used when the traveling control is stopped, to resume the control of the traveling photographing.

9. The camera control apparatus according to claim 7, wherein said control unit uses presets having a highest priority order to resume the control of the traveling photographing.

10. The camera control apparatus according to claim 1, wherein said priority order is represented by the number of times of traveling photographing cycles.

11. The camera control apparatus according to claim 1, wherein said priority order is represented by an occurrence probability of motion detection by said motion detection unit.

12. The camera control apparatus according to claim 11, wherein said priority order takes a value in a range from 0% to 100%, and said control unit does not effect control of photographing with respect to presets whose priority order is set to 0%, but transitions to next preset.

13. The camera control apparatus according to claim 1, wherein said presets are defined by at least one or a combination of a pan angle, a tilt angle, a zoom magnification factor, a focus, an exposure, a shutter speed, a white balance and a rear light correction factor.

14. A camera control apparatus comprising:
a setting unit for setting a plurality of presets each having a plurality of photographing parameters of a camera and priority orders of each of said plurality of presets; and
a control unit for controlling traveling photographing of the camera in accordance with said plurality of presets set by said setting unit, and controls whether photographing is performed or skipped at each preset in accordance with said priority order.

15. A camera control method comprising:
a control step of controlling traveling photographing of a camera in accordance with a plurality of presets each having a plurality of photographing parameters of the camera and priority orders of each of said plurality of presets stored in a storage unit;
a motion detection step of detecting motion of an object photographed with the camera; and
an update step of raising the priority order corresponding to one of said plurality of presets which is used when the motion is detected in said motion detection step.

16. The camera control method according to claim 15, wherein photographing is performed by a preset in said control step if the priority order of the preset is set to a threshold value or higher, and transitions to next preset without performing photographing by the preset if the priority order of the preset is set lower than said threshold value.

17. The camera control method according to claim 15, wherein each time a preset of said camera transitions to next preset, said update step lowers the priority order by a threshold value if the priority order of the preset is set to said threshold value or larger, and raises the priority order by a predetermined number if the priority order of the preset is set lower than said threshold value.

18. The camera control method according to claim 15, wherein if a motion of the photographed object is not detected in said motion detection step, said update step lowers the priority order of the preset with which said image is photographed is lowered in said update step.

19. The camera control method according to claim 15, wherein if a motion of said photographed object is detected in said motion detection step, control of the traveling photographing is stopped and tracking control for an object corresponding to said motion detected image is started.

20. The camera control method according to claim 19, wherein zoom control is performed together with said tracking control in said control step, said zoom control enlarging an area where the motion of said photographed object is detected.

21. The camera control method according to claim 19, wherein control of said tracking control and motion detection are performed in said control step, by said motion detection unit, of the object photographed with said camera, and if the number of times when the motion of the image is not detected in succession during said repetitive control in said motion detection step, reaches a predetermined number, said tracking control is stopped and the control of the traveling photographing is resumed in said control step.

22. The camera control method according to claim 21, wherein when the control resumes, the preset used in said control step when the traveling control is stopped, is used to resume the control of the traveling photographing.

23. The camera control method according to claim 21, wherein the preset having a highest priority order is used to resume the control of the traveling photographing in said control step.

24. The camera control method according to claim 15, wherein said preset is defined by at least one or a combination of a pan angle, a tilt angle, a zoom magnification factor, a focus, an exposure, a shutter speed, a white balance and a rear light correction factor.

25. A camera control method comprising:
a setting step of setting a plurality of presets each having a plurality of photographing parameters of a camera and priority orders of each of said plurality of presets; and
a control step of for controlling traveling photographing of the camera in accordance with said plurality of presets set in said setting step, and controlling whether photographing is performed or skipped at each preset in accordance with said priority order.

26. A computer readable medium which stores a program for causing a computer to execute a camera control method, said method comprising:
a control step of controlling traveling photographing of a camera in accordance with a plurality of presets each having a plurality of photographing parameters of the camera and priority orders of each of said plurality of presets stored in a storage unit;
a motion detection step of detecting motion of an object photographed with the camera; and
an update step of raising the priority order corresponding to one of said plurality of presets which is used when the motion is detected in said motion detection step.

27. A computer readable medium which stores a program for causing a computer to execute a camera control method, said method comprising:

a setting step of setting a plurality of presets each having a plurality of photographing parameters of a camera and priority orders of each of said plurality of presets; and a control step of controlling traveling photographing of the camera in accordance with said plurality of presets, and controlling whether photographing is performed or skipped at each preset in accordance with said priority order.

* * * * *